(12) United States Patent
Weaver et al.

(10) Patent No.: US 9,701,895 B2
(45) Date of Patent: Jul. 11, 2017

(54) DUAL PURPOSE VISCOSIFIER-SCALE INHIBITORS FOR USE IN SUBTERRANEAN FORMATION OPERATIONS

(71) Applicant: Halliburton Energy Services, Inc., Houston, TX (US)

(72) Inventors: Jim D. Weaver, Duncan, OK (US); Mike McCabe, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 63 days.

(21) Appl. No.: 14/907,348

(22) PCT Filed: Nov. 22, 2013

(86) PCT No.: PCT/US2013/071394
§ 371 (c)(1),
(2) Date: Jan. 25, 2016

(87) PCT Pub. No.: WO2015/076820
PCT Pub. Date: May 28, 2015

(65) Prior Publication Data
US 2016/0168456 A1  Jun. 16, 2016

(51) Int. Cl.
*E21B 43/26* (2006.01)
*C09K 8/90* (2006.01)
(Continued)

(52) U.S. Cl.
CPC .............. *C09K 8/90* (2013.01); *C09K 8/528* (2013.01); *C09K 8/68* (2013.01); *E21B 37/06* (2013.01); *E21B 43/26* (2013.01); *C09K 2208/26* (2013.01)

(58) Field of Classification Search
CPC . C09K 8/90; C09K 8/528; C09K 8/68; C09K 2208/26; E21B 37/06; E21B 43/26
(Continued)

(56) References Cited

U.S. PATENT DOCUMENTS

| 4,982,793 A | 1/1991 | Holtmyer et al. |
| 5,304,620 A * | 4/1994 | Holtmyer ................ C09K 8/08 166/278 |

(Continued)

FOREIGN PATENT DOCUMENTS

| CA | 2063316 A1 | 9/1992 |
| WO | 2015076820 A1 | 5/2015 |

OTHER PUBLICATIONS

International Search Report and Written Opinion for PCT/US2013/071394 dated Aug. 22, 2014.

*Primary Examiner* — Silvana Runyan
(74) *Attorney, Agent, or Firm* — McDermott Will & Emery LLP; Craig Roddy

(57) ABSTRACT

Embodiments described herein include a method comprising: providing a treatment fluid comprising an aqueous base fluid, a viscosifier-scale inhibitor agent, and a breaker, wherein the viscosifier-scale inhibitor agent comprises a polysaccharide gelling agent grafted with a chelating moiety; introducing the treatment fluid into a subterranean formation, wherein the polysaccharide gelling agent increases the viscosity of the treatment fluid and the chelating moiety remains inert; breaking treatment fluid with the breaker so as to reduce the viscosity of the treatment fluid and chemically release the chelating moiety from the polysaccharide gelling agent; and inhibiting scale within the subterranean formation using the chelating moiety.

7 Claims, 1 Drawing Sheet

(51) Int. Cl.
*C09K 8/528* (2006.01)
*C09K 8/68* (2006.01)
*E21B 37/06* (2006.01)

(58) Field of Classification Search
USPC .................. 166/308.1, 250.1, 350.1, 300
See application file for complete search history.

(56) References Cited

U.S. PATENT DOCUMENTS

| | | |
|---|---|---|
| 7,637,322 B2 | 12/2009 | Slabaugh et al. |
| 2004/0000402 A1* | 1/2004 | Nguyen ................... C09K 8/68 166/280.1 |
| 2007/0049501 A1* | 3/2007 | Saini ....................... C09K 8/506 507/260 |
| 2008/0020948 A1* | 1/2008 | Rodrigues ................ C02F 5/10 507/112 |
| 2008/0035338 A1 | 2/2008 | Pauls et al. |
| 2009/0180951 A1 | 7/2009 | Zimmerman et al. |
| 2011/0046025 A1 | 2/2011 | Rodrgues et al. |
| 2011/0082057 A1 | 4/2011 | Zhang et al. |
| 2011/0120712 A1* | 5/2011 | Todd ....................... C04B 28/02 166/280.1 |
| 2011/0129536 A1 | 6/2011 | Donati et al. |
| 2013/0023449 A1 | 1/2013 | Heath et al. |
| 2014/0367101 A1* | 12/2014 | Welton .................. E21B 43/267 166/280.2 |

\* cited by examiner

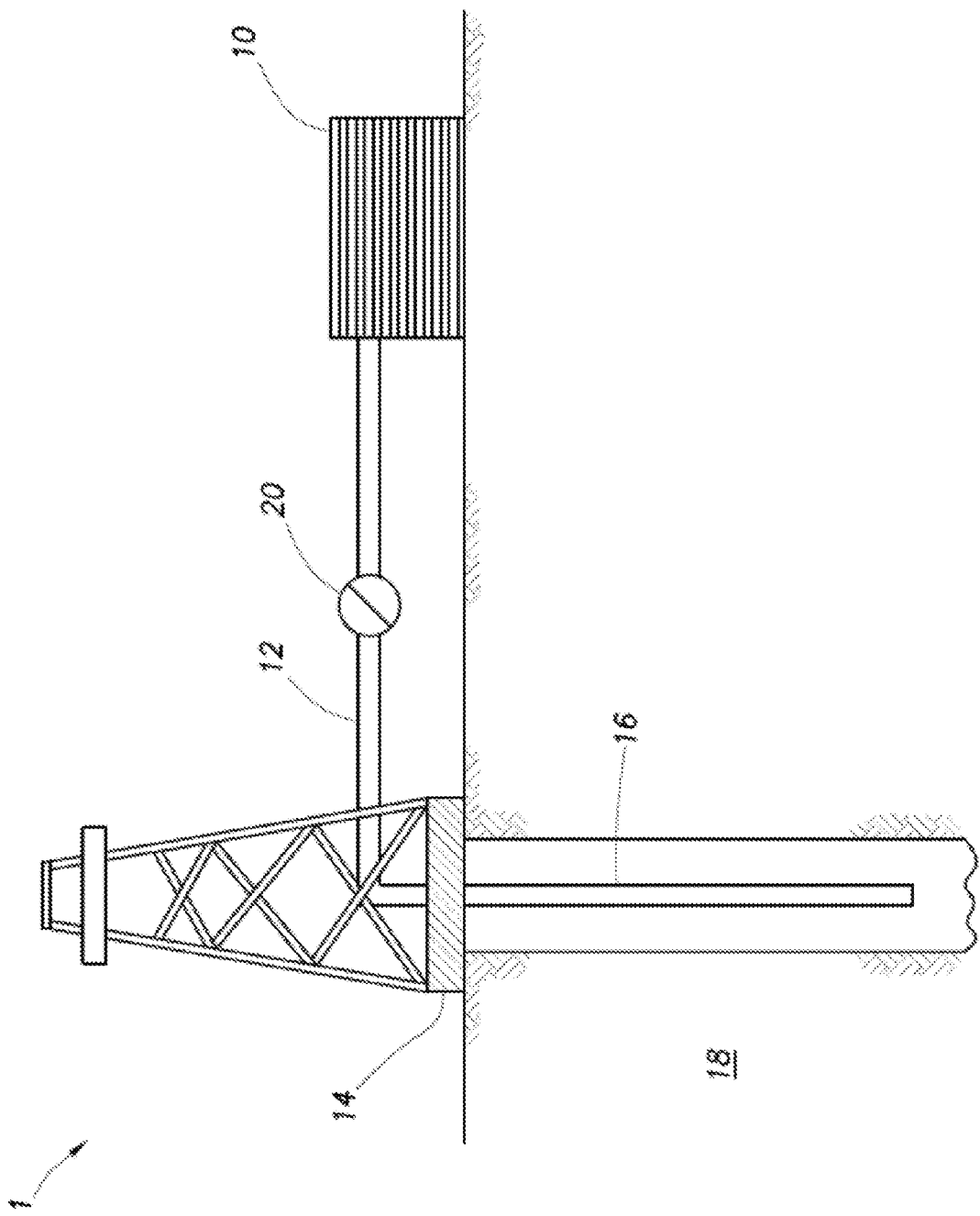

DUAL PURPOSE VISCOSIFIER-SCALE INHIBITORS FOR USE IN SUBTERRANEAN FORMATION OPERATIONS

BACKGROUND

The embodiments herein relate to dual purpose viscosifier-scale inhibitors for use in subterranean formation operations.

Subterranean wells (e.g., hydrocarbon producing wells, water producing wells, and the like) are often stimulated by hydraulic fracturing treatments. In hydraulic fracturing treatments, a treatment fluid is pumped into a portion of a subterranean formation at a rate and pressure such that the subterranean formation breaks down and one or more fractures are formed. Typically, particulate solids, such as graded sand, are suspended in a portion of the treatment fluid and then deposited into the fractures. These particulate solids, or "proppant particulates," serve to prop the fracture open (e.g., keep the fracture from fully closing) after the hydraulic pressure is removed. By keeping the fracture from fully closing, the proppant particulates aid in forming conductive paths through which produced fluids, such as hydrocarbons, may flow.

The degree of success of a fracturing operation depends, at least in part, upon fracture porosity and conductivity once the fracturing operation is complete and production has begun. Thus, the proppant particulates should be substantially evenly distributed throughout the treatment fluid such that a sufficient number of the proppant particulates are placed within a fracture to prop the fracture open. For this reason, viscosified treatment fluids are typically used to place proppant particulates into a fracture in a subterranean formation because the viscous nature of the treatment fluid is capable of maintaining the proppant particulates in suspension and reduce their tendency to settle out of the treatment fluid prior to reaching said fracture or other desired placement zone. The treatment fluids may be viscosified using gelling agents such as natural and synthetic polysaccharides (e.g., guar gums, cellulose derivatives, and the like), and/or combinations thereof. In some cases, the gelling agents may be crosslinked to further viscosify the treatment fluids.

In addition to viscosifing the treatment fluids, the gelling agents may additionally provide fluid loss control. As used herein, the term "fluid loss control" refers to reducing or preventing the volume of filtrate that passes through a filter medium. Specifically, the gelling agents may prevent the loss of the aqueous phase or other liquid phase of a treatment fluid from seeping into or otherwise becoming lost in permeable portions of a subterranean formation (e.g., a fracture or a proppant pack). Failure to control fluid loss may result in a reduction in the efficiency of a treatment fluid, such that the fluid is unable or less effective at propagating fractures or suspending proppant particulates.

In some cases, prior to, during, or after the production of a fractured subterranean formation, a scale inhibitor is placed into the formation to inhibit the formation of scale deposits in the production conduit. As used herein, the term "scale" refers to a mineral deposit or coating formed on the surface of metal, rock, or other material and "scale inhibitor" refers to a chemical agent or treatment used to control such deposition or coating. Scale inhibitor treatment fluids may traditionally be continuously injected into a wellbore through an injection port, for example, during completion operations. In some cases, a scale inhibitor is included with the treatment fluids comprising gelling agents used to fracture a subterranean formation, such that the scale inhibitor absorbs into the matrix and dissolves therein to prevent or reduce scale deposition. The scale inhibitor does not itself contribute to the productivity resulting from fracture stimulation and may increase the expense of a fracturing operation. Likewise, the gelling agent does not itself contribute to scale inhibition.

BRIEF DESCRIPTION OF THE DRAWINGS

The following FIGURES are included to illustrate certain aspects of the embodiments described herein, and should not be viewed as exclusive embodiments. The subject matter disclosed is capable of considerable modifications, alterations, combinations, and equivalents in form and function, as will occur to those skilled in the art and having the benefit of this disclosure.

FIG. 1 depicts an embodiment of a system configured for delivering the treatment fluids comprising the viscosifier-scale inhibitor agents of the embodiments described herein to a downhole location.

DETAILED DESCRIPTION

The embodiments herein relate to dual purpose viscosifier-scale inhibitors for use in subterranean formation operations. Specifically, in some embodiments, the disclosure relates to viscosifer-scale inhibitor agents that may act as viscisifiers during stimulation operations and that may undergo a chemical reaction to behave as scale inhibitors after stimulation operations have completed.

The dual viscosifier-scale inhibitor agents described in some embodiments herein may decrease costs associated with separately including scale inhibitors in fracturing treatment fluids and/or in having to perform secondary scale inhibitor treatment operations after fracturing is complete. Rather than increasing the viscosity of a fluid with one agent and providing a second agent to inhibit scale deposition, the embodiments herein provide a single agent that satisfy both functions that, among other things, may decrease cost, simplify storage, reduce wellbore and operator downtime, and the like.

Although some embodiments described herein are illustrated by reference to hydraulic stimulation treatments, the viscosifier-scale inhibitor agents disclosed herein may be used in any subterranean formation operation that may benefit from their dual viscosification and scale inhibition properties. Such treatment operations may include, but are not limited to, a drilling operation; a stimulation operation; an acidizing operation; an acid-fracturing operation; a sand control operation; a completion operation; a scale inhibiting operation; a water-blocking operation; a clay stabilizer operation; a fracturing operation; a frac-packing operation; a gravel packing operation; a wellbore strengthening operation; a sag control operation; and any combination thereof.

Moreover, the the viscosifier-scale inhibitor agents described herein may be used in any non-subterranean operation that may benefit from their dual viscosification and scale inhibition properties. Such operations may be performed in any industry including, but not limited to, oil and gas, mining, chemical, pulp and paper, aerospace, medical, automotive, and the like.

One or more illustrative embodiments disclosed herein are presented below. Not all features of an actual implementation are described or shown in this application for the sake of clarity. It is understood that in the development of an actual embodiment incorporating the embodiments disclosed herein, numerous implementation-specific decisions must be made to achieve the developer's goals, such as compliance with system-related, lithology-related, business-related, government-related, and other constraints, which vary by implementation and from time to time. While a developer's efforts might be complex and time-consuming, such efforts would be, nevertheless, a routine undertaking for those of ordinary skill the art having benefit of this disclosure.

It should be noted that when "about" is provided herein at the beginning of a numerical list, the term modifies each number of the numerical list. In some numerical listings of ranges, some lower limits listed may be greater than some upper limits listed. One skilled in the art will recognize that the selected subset will require the selection of an upper limit in excess of the selected lower limit. Unless otherwise indicated, all numbers expressing quantities of ingredients, properties such as molecular weight, reaction conditions, and so forth, used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the exemplary embodiments described herein. At the very least, and not as an attempt to limit the application of the doctrine of equivalents to the scope of the claim, each numerical parameter should at least be construed in light of the number of reported significant digits and by applying ordinary rounding techniques.

While compositions and methods are described herein in terms of "comprising" various components or steps, the compositions and methods can also "consist essentially of" or "consist of" the various components and steps. When "comprising" is used in a claim, it is open-ended.

Some embodiments described herein include a method comprising introducing a treatment fluid comprising an aqueous base fluid, a viscosifier-scale inhibitor agent, and a breaker into a subterranean formation. The viscosifier-scale inhibitor agent may comprise a polysaccharide gelling agent grafted with a chelating moiety. The polysaccharide gelling agent increases the viscosity of the treatment fluid and the chelating moiety remains inert. The treatment fluid is then broken with the breaker so as to reduce the viscosity of the treatment fluid. As used herein, the term "breaker" refers to an agent that is capable of reducing the viscosity of a treatment fluid, or "breaking" the treatment fluid. When the treatment fluid is broken with the breaker, the polysaccharide gelling agent is chemically released from the chelating moiety, so as to permit the chelating moiety to provide scale inhibition in the subterranean formation.

The breaker may chemically release the polysaccharide gelling agent from the chelating moiety by breaking the long-chain polysaccharide bonds to form sugar oligomers or sugar monomers. By doing so, the chelating moiety may become released or otherwise exposed from its grafted position to the polysaccharide gelling agent, thereby transforming the dormant moiety into a strong chelating moiety capable of bonding with the mineral scale deposits and preventing precipitation of damaging compounds. In some embodiments, the breaker may slowly breakdown the polysaccharide into sugar oligomers or sugar monomers to release or expose the grafted chelating moiety. The chelating moiety may prevent such precipitation by keeping certain mineral ions in a soluble form until they can be removed from a subterranean formation. Moreover, the breaker reduces the viscosity of the treatment fluid and renders the polysaccharide gelling agent inert or relatively inert due to reduction of its long-chain backbone into smaller segments. Thus, the treatment fluid, after it has sufficiently served its purpose, may be removed more easily from the subterranean formation.

In some embodiments, the treatment fluids comprising any of the viscosifier-scale inhibitor agents described herein may be introduced into the subterranean formation at a rate and pressure sufficient to create or enhance at least one fracture therein. In such embodiments, the treatment fluids may further comprise proppant particulates that may be deposited into the at least one fracture so as to form a proppant pack. In some embodiments, the treatment fluids may additionally comprise a crosslinking agent that may enhance the viscosity of the treatment fluid beyond that achieved with the viscosifier-scale inhibitor agents alone. The crosslinking agent may be capable of crosslinking two or more of the polysaccharide gelling agents included in the viscosifier-scale inhibitor agents described herein to increase the viscosity of the treatment fluid by forming a network of viscosifier-scale inhibitor agents. The crosslinking agent may be particularly beneficial when the treatment fluid comprises proppant particulates or other particulates for use in a particular subterranean formation operation.

In some embodiments, the presence of the chelating moiety may adversely interfere with the selected crosslinking agent, hindering or preventing crosslinking of two or more polysaccharide gelling agents in the viscosifier-scale inhibitor agents described herein. In such embodiments, it may be beneficial to chemically modify the chelating moiety with a protecting group. The protecting group may prevent the chelating moiety from acting as a chelator until "activation" by removal of the protecting group.

In some embodiments herein, the viscosifier-scale inhibitor comprising a polysaccharide gelling agent grafted with a chelating moiety is further chemically modified with a protecting group. Some embodiments described herein include a method of introducing a treatment fluid comprising an aqueous base fluid, the viscosifier-scale inhibitor comprising the polysaccharide gelling agent grafted with a chelating moiety modified with a protecting group, and a breaker into a subterranean formation. The polysaccharide gelling agent increases the viscosity of the treatment fluid and the chelating moiety remains inert. The treatment fluid is thereafter broken and the breaker reduces the viscosity of the treatment fluid and releases the polysaccharide gelling agent from the chelating moiety. Due to the presence of the protecting group, the chelating moiety remains inert. Upon release of the protecting group, the chelating moiety provides scale inhibition in the subterranean formation.

The protecting group may be released using any means known in the art based on the type of protecting group chosen, as will be appreciated by those skilled in the art. For example, the protecting group may be released by hydrolysis, temperature, pH (i.e., removal by add or base), hydrogenolysis, oxidation, reduction, and the like. Inclusion of a protecting group on the chelating moiety may be desirable when delayed control of scale inhibitor (i.e., release of the chelating moiety) is preferred after breaking the treatment fluid.

In some embodiments, it may be desirable to have a combination of a first viscosifier-scale inhibitor agent comprising a polysaccharide gelling agent grafted to a chelating moiety and a second viscosifier-scale inhibitor agent grafted to a chelating moiety chemically modified with a protecting group. In such embodiments, a method may be included herein comprising introducing a treatment fluid into a subterranean formation, the treatment fluid comprising an aqueous base fluid, a first viscosifier-scale inhibitor agent, a second viscosifier-scale inhibitor agent, and a breaker. The first viscosifier-scale inhibitor agent comprises a first polysaccharide gelling agent grafted with a first chelating moiety and the second viscosifier-scale inhibitor agent comprises a second polysaccharide gelling agent grafted with a second chelating moiety chemically modified with a protecting group. The first and second polysaccharide gelling agents increase the viscosity of the treatment fluid and the first and second chelating moieties remain inert. Thereafter, the treatment fluid is broken with a breaker so as to reduce the viscosity of the treatment fluid. The breaking chemically releases first polysaccharide gelling agent from the first chelating moiety, so as to permit the first chelating moiety to provide scale inhibition, and the breaking chemically releases the second polysaccharide gelling agent from the second chelating moiety, and the second chelating moiety remains inert due to the protecting group. Then, the protecting group is released from the second chelating moiety, so as to permit the second chelating moiety to provide scale inhibition.

It may be desirable to include both the first and second viscosifier-scale inhibitor agent types to provide prolonged scale inhibition or to provide a certain amount of scale inhibition immediately after breaking the fluid as compared to additional scale inhibition after the elapse of a certain time period, depending on the type of protecting group selected. In some embodiments, the viscosifier-scale inhibitor agents described herein may be present in the treatment fluids in a range of from a lower limit of about 10 pounds per 1000 gallons ("lb/Mgal"), 17.5 lb/Mgal, 25 lb/Mgal, 32.5 lb/Mgal, 40 lb/Mgal, 47.5 lb/Mgal, 55 lb/Mgal, 62.5 lb/Mgal, 70 lb/Mgal, 77.5 lb/Mgal, and 85 lb/Mgal to an upper limit of 166 lb/Mgal, 158.5 lb/Mgal, 151 lb/Mgal, 143.5 lb/Mgal, 136 lb/Mgal, 128.5 lb/Mgal, 121 lb/Mgal, 113.5 lb/Mgal, 106 lb/Mgal, 98.5 lb/Mgal, 91 lb/Mgal, 83.5 lb/Mgal of the treatment fluid.

The polysaccharide gelling agent may grafted to the chelating moiety (with or without chemical modification with a protecting group) by any means known in the art. As used herein, the term "graft" and all of its variants refers to the attachment of two or more distinct chemical species through bonding (e.g., the polysaccharide gelling agent and the chelating moiety). In some embodiments the polysaccharide gelling agent may be grafted to the chelating moiety using radical polymerization, chemical treatment, photo-irradiation, high energy radiation, and any other suitable technique. The polysaccharide gelling agent and chelating moiety may be grafted to form a covalent bond, a coordinate bond, a hydrogen bond, or any combination thereof between complementary reactive groups.

The polysaccharide gelling agents for use in the viscosifier-scale inhibitor agents described herein may be any polysaccharide gelling agent capable of viscosifiying treatment fluids for use in subterranean formation operations. In some embodiments, the polysaccharide gelling agents include, but are not limited to, guar gum (e.g., hydroxyethyl guar, hydroxypropyl guar, carboxymethyl guar, carboxymethylhydroxyethyl guar, and carboxymethylhydroxypropyl guar (CMHPG)); a cellulose (e.g., hydroxyethyl cellulose, carboxyethylcellulose, carboxymethylcellulose, and carboxymethylhydroxyethylcellulose); xanthan; scleroglucan; succinoglycan; diutan; any derivative thereof; and any combination thereof. In some embodiments, the polysaccharide gelling agent may be present in the range of a lower limit of about 10 lb/Mgal, 17.5 lb/Mgal, 25 lb/Mgal, 32.5 lb/Mgal, 40 lb/Mgal, 47.5 lb/Mgal, 55 lb/Mgal, 62.5 lb/Mgal, 70 lb/Mgal, 77.5 lb/Mgal, and 85 lb/Mgal to an upper limit of 166 lb/Mgal, 158.5 lb/Mgal, 151 lb/Mgal, 143.5 lb/Mgal, 136 lb/Mgal, 128.5 lb/Mgal, 121 lb/Mgal, 113.5 lb/Mgal, 106 lb/Mgal, 98.5 lb/Mgal, 91 lb/Mgal, 83.5 lb/Mgal of the treatment fluid.

In some embodiments, the treatment fluids described herein may further comprise a crosslinking agent. The crosslinking agent may be capable of crosslinking two or more of the polysaccharide gelling agents included in the viscosifier-scale inhibitor agents described herein to increase the viscosity of the treatment fluid. The crosslinking agent may comprise a borate ion, a metal ion, or similar component that is capable of crosslinking at least two molecules of the polysaccharide gelling agent. Examples of suitable crosslinking agents include, but are not limited to, borate ions; magnesium ions; zirconium IV ions; titanium IV ions; aluminum ions; antimony ions; chromium ions; iron ions; copper ions; magnesium ions; zinc ions; and any combination thereof. These ions may be present by providing any compound that is capable of producing one or more of these ions. Examples of such compounds include, but are not limited to, ferric chloride; boric acid; disodium octaborate tetrahydrate; sodium diborate; pentaborate; ulexite; colemanite; magnesium oxide; zirconium lactate; zirconium triethanol amine; zirconium lactate triethanolamine; zirconium carbonate; zirconium acetylacetonate; zirconium malate; zirconium citrate; zirconium diisopropylamine lactate; zirconium glycolate; zirconium triethanol amine glycolate; zirconium lactate glycolate; titanium lactate; titanium malate; titanium citrate; titanium ammonium lactate; titanium triethanolamine; titanium acetylacetonate; aluminum lactate; aluminum citrate; antimony compounds; chromium compounds; iron compounds; copper compounds; zinc compounds; and any combination thereof.

In certain embodiments, the crosslinking agent may be formulated to remain inactive until it is "activated" by, among other things, certain conditions in the fluid (e.g., pH, temperature, etc.) and/or interaction with some other substance. In some embodiments, the activation of the crosslinking agent may be delayed by encapsulation with a coating (e.g., a porous coating through which the crosslinking agent may diffuse slowly, or a degradable coating that degrades downhole) that delays the release of the crosslinking agent until a desired time or place. The choice of a particular crosslinking agent will be governed by several considerations that will be recognized by one skilled in the art, with the benefit of this disclosure, including but not limited to, the type of polysaccharide gelling agent(s) included in the viscosifier-scale inhibitor agent(s); the molecular weight of those polysaccharide gelling agent(s); the conditions in the subterranean formation being treated; the safety handling requirements; the pH of the treatment fluid, and the like.

When included, suitable crosslinking agents may be present in the treatment fluids in an amount sufficient to provide the desired degree of crosslinking between molecules of the polysaccharide gelling agent. In some embodiments, the crosslinking agent may be present in the treatment fluid based on the amount of polysaccharide gelling agent present. In certain embodiments, the crosslinking agent may be present in an amount in the range of from a lower limit of about 0.01 gal/pound ("gal/lb"), 0.015 gal/lb, 0.02 gal/lb, 0.025 gal/lb, 0.03 gal/lb, 0.035 gal/lb, 0.04 gal/lb to an upper limit of about 0.075 gal/lb, 0.07 gal/lb, 0.065 gal/lb, 0.06 gal/lb, 0.055 gal/lb, 0.05 gal/lb, 0.045 gal/lb, and 0.04 gal/lb of the polysaccharide gelling agent present in the treatment fluid. One of ordinary skill in the art, with the benefit of this disclosure, will recognize the appropriate amount of cross-linking agent to include in the treatment fluids described herein based on, among other things, the temperature conditions of a particular application, the type of polysaccharide gelling agent(s) used in the viscosifier-scale inhibitor agent (s), the molecular weight of the polysaccharide gelling agent(s), the desired degree of viscosification, the pH of the treatment fluid, and the like.

The chelating moiety grafted to the polysaccharide gelling agents to form the viscosifier-scale inhibitor agents described herein may be any chelating moiety compatible with a particular polysaccharide gelling agent and capable of providing scale inhibition. In some embodiments, the chelating moiety may include, but may not be limited to, a monodentate chelating moiety; a bidentate chelating moiety; a tridentate chelating moiety; a tetradentate chelating moiety; a pentadentate chelating moiety; a hexadentate chelating moiety; a septadentate chelating moiety; an octodentate chelating moiety; and any combination thereof. Specific chelating moieties may include, but are not limited to, phosphonic acid; 3-chloropropyl phosphonic acid; iminodiacetic acid (IDA); nitrilotriacetic acid (NTA); terpyridine; bipyridiene; triethylenetetraamine; biethylene triamine; ethylenediaminetetraacetic acid (EDTA); N-hydroxyethylethylenediamine-N,N',N'-triacetic acid (HDTA); trans-1,2-diaminocyclohexane-N,N,N',N'-tetraacetic acid (CDTA); ethylenedioxybis(ethyliminodi(acetic acid)) (EGTA); diethylene triamine pentaacetic acid (DTPA); triethylenetetramine-N,N,N',N'',N''',N'''-hexaacetic add (TTHA) (and N,N'-dis(butanamide) derivative); 1,4,7,10-tetraazacyclododecane-1,4,7,10-tetraacetic acid (DOTA); 1-hydroxyethane 1,1-diphosphonic acid (HEDP); ethylene diamine tetra (methylene phosphonic acid) (EDTMPA); aminotris (methylene phosphonic acid) (ATMP); 1-hydroxyethylidene diphosphonic acid (HEDP); diethylene triamine penta (methylene phosphonic acid) (DTPMP); N''-carboxymethyldiethylenetriamine-N,N,N',N''-tetraacetate (HDTPA); nitrolotripropionic acid (NTP); 1,4,7,10-tetraazacyclodedecane-1,4,7,10-tetraphosphonic acid (DOTP); nitrilotrimethylenephosphonic acid (NTMP); ethylenediamine tetra(methylene phosphonic acid) (EDTMP); diethylenetriamine penta(methylene phosphonic acid) (DTPMP); bis(hexamethylene)triamine (BHMT); bis(hexamethylene triamine penta (methylene phosphonic acid)) (BHMTPMPA); any derivative thereof; and any combination thereof. As used herein, the term "derivative" refers to any compound that is made from one of the listed compounds, for example, by replacing one atom in one of the listed compounds with another atom or group of atoms, ionizing one of the listed compounds, or creating a salt of one of the listed compounds.

The chelating moiety described in some embodiments herein may be present in the viscosifier-scale inhibitor agent in any amount capable of permitting the chelating moiety to graft onto the polysaccharide gelling agent and provide sufficient scale inhibiting properties without interfering with the ability of the polysaccharide gelling agent in the viscosifier-scale inhibitor agent to viscosify the treatment fluids described herein (e.g., without preventing hydration of the polysaccharide gelling agents). In some embodiments, the chelating moiety may be present in the range of from a lower limit of about 0.001%, 0.002%, 0.003%, 0.004%, and 0.005% to an upper limit of about 0.01%, 0.009%, 0.008%, 0.007%, 0.006%, and 0.005% by weight of the polysaccharide gelling agent. In some embodiments, the chelating moiety may be present in an amount of about 0.005% by weight of the polysaccharide gelling agent.

In some embodiments, the chelating moiety may be chemically modified with a protecting group designed to prevent the chelating moiety from acting as a scale inhibitor until the protecting group is released from the chelating moiety. The protecting group may be any protecting group compatible with the chelating moiety. In some embodiments, the chelating moiety may be an ester protecting group. Suitable specific ester protecting groups may include, but are not limited to, a methyl ester group; a benzyl ester group; a p-nitrobenzyl group; a dimethylallyl ester group; a 2-trimethylsilyl-2-propyl ester group; a tert-butyl group; an isopropyl ester group; a sulfonic acid isopropyl ester group; and any combination thereof. In some embodiments, the chelating moiety may be protected with one or more protecting groups, depending on the chemistry of the particular chelating moiety selected, as will be appreciated by one of skill in the art, with the benefit of this disclosure.

The breaker may be included in the treatment fluids described herein so as to reduce the viscosity of the treatment fluids by at least causing the polysaccharide gelling agents to be broken into smaller segments. Suitable breakers may include, but are not limited to, an enzyme breaker; an oxidizing breaker; a buffered acid breaker; a delayed breaker; and any combination thereof. In some embodiments, the breaker may be formulated to remain inactive until it is "activated" by, among other things, certain conditions in the treatment fluid (e.g., pH, temperature, and the like) and/or interaction with some other substance. In some embodiments, the breaker may be delayed by encapsulation with a coating that delays the release of the gel breaker (e.g., a porous coating through which the breaker may diffuse slowly, or a degradable coating that degrades downhole). In other embodiments, the breaker may be a degradable material (e.g., polylactic acid or polygylcolic acid) that releases an acid or alcohol in the presence of the aqueous base fluid in the treatment fluids described herein.

In certain embodiments, the breaker may be in the form of a non-liquid and may be present in the treatment fluids in an amount in the range of from a lower limit of about 0.01 lb/Mgal, 1 lb/Mgal, 2.5 lb/Mgal, 5 lb/Mgal, 7.5 lb/Mgal, 10 lb/Mgal, 12.5 lb/Mgal, and 15 lb/Mgal to an upper limit of about 30 lb/Mgal, 27.5 lb/Mgal, 25 lb/Mgal, 22.5 lb/Mgal, 20 lb/Mgal, 17.5 lb/Mgal, 15 lb/Mgal of the treatment fluid. In other embodiments, the breaker may be in the form of a liquid and may be present in the treatment fluids in an amount in the range of from a lower limit of about 0.01 gallons/1000 gallons ("gal/Mgal"), 1 gal/Mgal, 2.5 gal/Mgal, 5 gal/Mgal, 7.5 gal/Mgal, 10 gal/Mgal, 12.5 gal/Mgal, and 15 gal/Mgal to an upper limit of about 30 gal/Mgal, 27.5 gal/Mgal, 25 gal/Mgal, 22.5 gal/Mgal, 20 gal/Mgal, 17.5 gal/Mgal, 15 gal/Mgal of the treatment fluid. One of ordinary skill in the art, with the benefit of this disclosure, will recognize the type and amount of a breaker to include in certain treatment fluids of the embodiments described herein based on, among other factors, the desired amount of delay time before the breaker is activated, the type of viscosifier-scale inhibitor agent(s) used, the temperature conditions of a particular application, the desired rate and degree of viscosity reduction, the pH of the treatment fluid, and the like.

Suitable aqueous base fluids for use in the treatment fluids described in some embodiments herein may be any aqueous fluid suitable for use in a subterranean formation operation. In some embodiments, the aqueous base fluid may include, but may not be limited to, fresh water; saltwater (e.g., water containing one or more salts dissolved therein); brine (e.g., saturated salt water); seawater; and any combination thereof. In some embodiments, the aqueous base fluid may be an aqueous-miscible fluid. Suitable aqueous-miscible fluids may include, but not be limited to, an alcohol (e.g., methanol, ethanol, n-propanol, isopropanol, n-butanol, sec-butanol, isobutanol, and t-butanol); a glycerin; a glycol (e.g., polyglycols, propylene glycol, and ethylene glycol); a polyglycol amine; a polyol; any derivative thereof; any in combination with a salt (e.g., sodium chloride, calcium chloride, calcium bromide, zinc bromide, potassium carbonate, sodium formate, potassium formate, cesium formate, sodium acetate, potassium acetate, calcium acetate, ammonium acetate, ammonium chloride, ammonium bromide, sodium nitrate, potassium nitrate, ammonium nitrate, ammonium sulfate, calcium nitrate, sodium carbonate, and potassium carbonate); any in combination with freshwater, saltwater, brine, or seawater; and any combination thereof.

Generally, the water in the aqueous base fluid may be from any source, provided that it does not contain components that might adversely affect the stability and/or performance of the viscosified-scale inhibitor agents of the embodiments herein. In certain embodiments, the density of the aqueous base fluid may be adjusted, among other purposes, to provide additional viscosity to the treatment fluids. In certain embodiments, the pH of the aqueous base fluid may be adjusted (e.g., by a buffer or other pH adjusting agent), among other purposes, to activate a crosslinking agent and/or to reduce the viscosity of the treatment fluid (e.g., activate a breaker, deactivate a crosslinking agent). One of ordinary skill in the art, with the benefit of this disclosure, will recognize when such pH adjustments are appropriate. In some embodiments, the pH range may preferably be from about 4 to about 11.

In some embodiments, the treatment fluids comprising the viscosifier-scale inhibitor agents described herein may further comprise an additive selected from the group consisting of a salt; a weighting agent; a fluid loss control agent; a dispersion aid; a corrosion inhibitor; a surfactant; a particulate; a proppant; a lost circulation material; a foaming agent; a gas; a pH control additive; a biocide; a friction reducer; a clay stabilizing agent; a gelling agent; a scale inhibitor; and any combination thereof.

In various embodiments, systems configured for delivering the treatment fluids described herein to a downhole location are described. In various embodiments, the systems can comprise a pump fluidly coupled to a tubular, the tubular containing a treatment fluid comprising the viscosifier-scale inhibitor agents described herein.

The pump may be a high pressure pump in some embodiments. As used herein, the term "high pressure pump" will refer to a pump that is capable of delivering a fluid downhole at a pressure of about 1000 psi or greater. A high pressure pump may be used when it is desired to introduce the treatment fluid to a subterranean formation at or above a fracture gradient of the subterranean formation, but it may also be used in cases where fracturing is not desired. In some embodiments, the high pressure pump may be capable of fluidly conveying particulate matter, such as proppant particulates, into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the treatment fluid to the high pressure pump. In such embodiments, the low pressure pump may "step up" the pressure of the treatment fluid before it reaches the high pressure pump.

In some embodiments, the systems described herein can further comprise a mixing tank that is upstream of the pump and in which the treatment fluid is formulated. In various embodiments, the pump (e.g., a low pressure pump, a high pressure pump, or a combination thereof) may convey the treatment fluid from the mixing tank or other source of the treatment fluid to the tubular. In other embodiments, however, the treatment fluid can be formulated offsite and transported to a worksite, in which case the treatment fluid may be introduced to the tubular via the pump directly from its shipping container (e.g., a truck, a railcar, a barge, or the like) or from a transport pipeline. In either case, the treatment fluid may be drawn into the pump, elevated to an appropriate pressure, and then introduced into the tubular for delivery downhole.

FIG. 1 shows an illustrative schematic of a system that can deliver treatment fluids of the present invention to a downhole location, according to one or more embodiments. It should be noted that while FIG. 1 generally depicts a land-based system, it is to be recognized that like systems may be operated in subsea locations as well. As depicted in FIG. 1, system 1 may include mixing tank 10, in which a treatment fluid of the present invention may be formulated. The treatment fluid may be conveyed via line 12 to wellhead 14, where the treatment fluid enters tubular 16, tubular 16 extending from wellhead 14 into subterranean formation 18. Upon being ejected from tubular 16, the treatment fluid may subsequently penetrate into subterranean formation 18. Pump 20 may be configured to raise the pressure of the treatment fluid to a desired degree before its introduction into tubular 16. It is to be recognized that system 1 is merely exemplary in nature and various additional components may be present that have not necessarily been depicted in FIG. 1 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 1, the treatment fluid may, in some embodiments, flow back to wellhead 14 and exit subterranean formation 18. In some embodiments, the treatment fluid that has flowed back to wellhead 14 may subsequently be recovered and recirculated to subterranean formation 18.

It is also to be recognized that the disclosed treatment fluids may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 1.

Embodiments disclosed herein include:

A. A method comprising: providing a treatment fluid comprising an aqueous base fluid, a viscosifier-scale inhibitor agent, and a breaker, wherein the viscosifier-scale inhibitor agent comprises a polysaccharide gelling agent grafted with a chelating moiety; introducing the treatment fluid into a subterranean formation, wherein the polysaccharide gelling agent increases the viscosity of the treatment fluid and the chelating moiety remains inert; breaking treatment fluid with the breaker so as to reduce the viscosity of the treatment fluid and chemically release the chelating moiety from the polysaccharide gelling agent; and inhibiting scale within the subterranean formation using the chelating moiety.

B. A method comprising: providing a treatment fluid comprising an aqueous base fluid, a viscosifier-scale inhibitor agent, and a breaker, wherein the viscosifier-scale inhibitor agent comprises a polysaccharide gelling agent grafted with a chelating moiety chemically modified with a protecting group; introducing the treatment fluid into a subterranean formation, wherein the polysaccharide gelling agent increases the viscosity of the treatment fluid and the chelating moiety remains inert; breaking treatment fluid with the breaker so as to reduce the viscosity of the treatment fluid and chemically release the chelating moiety from the polysaccharide gelling agent, wherein the chelating moiety remains inert due to the protecting group; and releasing the protecting group from the chelating moiety, so as to permit the chelating moiety to provide scale inhibition.

C. A method comprising: providing a treatment fluid comprising an aqueous base fluid, a first viscosifier-scale inhibitor agent, a second viscosifier-scale inhibitor agent, and a breaker; wherein the first viscosifier-scale inhibitor agent comprises a first polysaccharide gelling agent grafted with a first chelating moiety, and wherein the second viscosifier-scale inhibitor agent comprises a second polysaccharide gelling agent grafted with a second chelating moiety chemically modified with a protecting group; introducing the treatment fluid into a subterranean formation, wherein the first and second polysaccharide gelling agents increase the viscosity of the treatment fluid and wherein the first and second chelating moieties remain inert; breaking treatment fluid with the breaker so as to reduce the viscosity of the treatment fluid, wherein the breaking chemically releases the first polysaccharide gelling agent from the first chelating moiety, so as to permit the first chelating moiety to provide scale inhibition, wherein the breaking chemically releases the second polysaccharide gelling agent from the second chelating moiety, and the second chelating moiety remains inert due to the protecting group; and releasing the protecting group from the second chelating moiety, so as to permit the second chelating moiety to provide scale inhibition.

Each of embodiments A, B, and C may have one or more of the following additional elements in any combination:

Element 1: Wherein the treatment fluid is introduced into the subterranean formation at a rate and pressure sufficient to create or enhance at least one fracture therein.

Element 2: Wherein the polysaccharide gelling agent is selected from the group consisting of a guar gum; a cellulose; xanthan; scleroglucan; succinoglycan; diutan; any derivative thereof; and any combination thereof.

Element 3: Wherein the chelating moiety is a monodentate chelating moiety; a bidentate chelating moiety; a tridentate chelating moiety; a tetradentate chelating moiety; a pentadentate chelating moiety; a hexadentate chelating moiety; a septadentate chelating moiety; an octodentate chelating moiety; and any combination thereof.

Element 4: Wherein the chelating moiety is selected from the group consisting of phosphonic acid; 3-chloropropyl phosphonic acid; iminodiacetic acid (IDA); nitrilotriacetic acid (NTA); terpyridine; bipyridiene; triethylenetetraamine; biethylene triamine; ethylenediaminetetraacetic acid (EDTA); N-hydroxyethylethylenediamine-N,N',N'-triacetic acid (HDTA); trans-1,2-diaminocyclohexane-N,N,N',N''-tetraacetic acid (CDTA); ethylenedioxybis(ethyliminodi (acetic acid)) (EGTA); diethylene triamine pentaacetic acid (DTPA); triethylenetetramine-N,N,N',N'',N''',N'''-hexaacetic acid (TTHA) (and N,N'-bis(butanarnide) derivative); 1,4,7,10-tetraazacyclododecane-1,4,7,10-tetraacetic acid (DOTA); 1-hydroxyethane 1,1-diphosphonic acid (HEDP); ethylene diamine tetra (methylene phosphonic acid) (EDTMPA); aminotris (methylene phosphonic acid) (ATMP); 1-hydroxyethylidene diphosphonic acid (HEDP); diethylene triamine penta (methylene phosphonic acid) (DTPMP); N''-carboxymethyldiethylenetriamine-N,N,N',N''-tetraacetate (HDTPA); nitrolotripropionic acid (NTP); 1,4,7,10-tetraazacyclododecane-1,4,7,10-tetraphosphonic add (DOTP); nitrilotrimethylenephosphonic acid (NTMP); ethylenediamine tetra(methylene phosphonic acid) (EDTMP); diethylenetriamine penta(methylene phosphonic acid) (DTPMP); bis(hexamethylene)triamine (BHMT); bis(hexamethylene triamine penta (methylene phosphonic acid)) (BHMTPMPA); any derivative thereof; and any combination thereof.

Element 5: Wherein the protecting group is removed from the chelating moiety by hydrolysis in the treatment fluid.

Element 6: Wherein the protecting group is an ester protecting group.

Element 7: Wherein the protecting group is an ester protecting group selected from the group consisting of a methyl ester group; a benzyl ester group; a p-nitrobenzyl group; a dimethylallyl ester group; a 2-trimethylsilyl-2-propyl ester group; a tert-butyl group; an isopropyl ester group; a sulfonic acid isopropyl ester group; and any combination thereof.

By way of non-limiting example, exemplary combinations applicable to A, B, and C include: A with 1, 3, and 4; B with 2 and 7; or C with 3, 5, and 6.

Therefore, the embodiments described herein are well adapted to attain the ends and advantages mentioned as well as those that are inherent therein. The particular embodiments disclosed above are illustrative only, as the embodiments may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the disclosure. The embodiments illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A method comprising:
    providing a treatment fluid comprising an aqueous base fluid, a first viscosifier-scale inhibitor agent, a second viscosifier-scale inhibitor agent, and a breaker;
    wherein the first viscosifier-scale inhibitor agent comprises a first polysaccharide gelling agent grafted with a first chelating moiety, and
        wherein the second viscosifier-scale inhibitor agent comprises a second polysaccharide gelling agent grafted with a second chelating moiety chemically modified with a protecting group;
    introducing the treatment fluid into a subterranean formation,
    wherein the first and second polysaccharide gelling agents increase the viscosity of the treatment fluid and wherein the first and second chelating moieties remain inert;
    breaking the treatment fluid with the breaker so as to reduce the viscosity of the treatment fluid,
        wherein the breaking chemically releases the first polysaccharide gelling agent from the first chelating moiety, so as to permit the first chelating moiety to provide scale inhibition,
        wherein the breaking chemically releases the second polysaccharide gelling agent from the second chelating moiety, and the second chelating moiety remains inert due to the protecting group; and
    releasing the protecting group from the second chelating moiety, so as to permit the second chelating moiety to provide scale inhibition.

2. The method of claim 1, wherein the treatment fluid is introduced into the subterranean formation at a rate and pressure sufficient to create or enhance at least one fracture therein.

3. The method of claim 1, wherein the first and the second polysaccharide gelling agent is selected from the group consisting of a guar gum; a cellulose; xanthan; scleroglucan; succinoglycan; diutan; any derivative thereof; and any combination thereof.

4. The method of claim 1, wherein the first and the second chelating moiety is a monodentate chelating moiety; a bidentate chelating moiety; a tridentate chelating moiety; a tetradentate chelating moiety; a pentadentate chelating moiety; a hexadentate chelating moiety; a septadentate chelating moiety; an octodentate chelating moiety; and any combination thereof.

5. The method of claim 1, wherein the first and the second chelating moiety is selected from the group consisting of phosphonic acid; 3-chloropropyl phosphonic acid; iminodiacetic acid (IDA); nitrilotriacetic acid (NTA); terpyridine; bipyridiene; triethylenetetraamine; biethylene triamine; ethylenediaminetetraacetic acid (EDTA); N-hydroxyethylethylenediamine-N,N',N'-triacetic acid (HDTA); trans-1,2-diaminocyclohexane-N,N,N',N'-tetraacetic acid (CDTA); ethylenedioxybis(ethyliminodi(acetic acid)) (EGTA); diethylene triamine pentaacetic acid (DTPA); triethylenetetramine-N,N,N',N'',N''',N'''-hexaacetic acid (TTHA) (and N,N'-bis(butanamide) derivative); 1,4,7,10-tetraazacyclododecane-1,4,7,10-tetraacetic acid (DOTA); 1-hydroxyethane 1,1-diphosphonic acid (HEDP); ethylene diamine tetra (methylene phosphonic acid) (EDTMPA); aminotris (methylene phosphonic acid) (ATMP); 1-hydroxyethylidene diphosphonic acid (HEDP); diethylene triamine penta (methylene phosphonic acid) (DTPMP); N''-carboxymethyldiethylenetriamine-N,N,N',N''-tetraacetate (HDTPA); nitrolotripropionic acid (NTP); 1,4,7,10-tetraazacyclodedecane-1,4,7,10-tetraphosphonic acid (DOTP); nitrilotrimethylenephosphonic acid (NTMP); any derivative thereof; ethylenediamine tetra(methylene phosphonic acid) (EDTMP); diethylenetriamine penta(methylene phosphonic acid) (DTPMP); bis(hexamethylene)triamine (BHMT); bis(hexamethylene triamine penta (methylene phosphonic acid)) (BHMTPMPA); any derivative thereof; and any combination thereof.

6. The method of claim 1, wherein the protecting group is an ester protecting group.

7. The method of claim 6, wherein the ester protecting group is selected from the group consisting of a methyl ester group; a benzyl ester group; a p-nitrobenzyl group; a dimethylallyl ester group; a 2-trimethylsilyl-2-propyl ester group; a tert-butyl group; an isopropyl ester group; a sulfonic acid isopropyl ester group; and any combination thereof.

* * * * *